United States Patent
Valentine

(10) Patent No.: US 7,735,280 B2
(45) Date of Patent: Jun. 15, 2010

(54) SHOCK ABSORBER FOR SPORTS FLOOR

(76) Inventor: Jim Louis Valentine, 10309 E. Tower Estates, Glencoe, OK (US) 74032

( * ) Notice: Subject to any disclaimer, the term of this patent is extended or adjusted under 35 U.S.C. 154(b) by 0 days.

(21) Appl. No.: 12/035,488

(22) Filed: Feb. 22, 2008

(65) Prior Publication Data
US 2009/0211192 A1 Aug. 27, 2009

(51) Int. Cl.
E04F 15/22 (2006.01)
(52) U.S. Cl. .................... 52/403.1; 52/480; 248/632; 248/634; 267/153
(58) Field of Classification Search ............... 52/403.1, 52/480, 177, 167.7, 167.8; 472/92; 267/139, 267/140, 145, 153, 152, 182, 292, 70, 141.1, 267/35; 248/560, 603, 618, 615, 599, 562, 248/188.8, 188.9, 362, 346.11, 632, 633
See application file for complete search history.

(56) References Cited

U.S. PATENT DOCUMENTS

| | | | | |
|---|---|---|---|---|
| 1,806,341 A | * | 5/1931 | Gavaza | ................... 248/615 |
| 1,969,266 A | * | 8/1934 | Herold | ............... 248/346.11 |
| 2,225,093 A | * | 12/1940 | Avery | ................... 248/615 |
| 2,357,120 A | * | 8/1944 | Kuebert et al. | .......... 248/632 |
| 2,458,621 A | * | 1/1949 | Miller | .................... 16/42 T |
| 3,305,227 A | * | 2/1967 | Henley | ................... 267/153 |
| 3,361,467 A | * | 1/1968 | Ludwikowski | ........... 293/136 |
| 3,368,806 A | | 2/1968 | Szonn | |
| 4,521,979 A | * | 6/1985 | Blaser | ....................... 36/29 |
| 4,860,516 A | * | 8/1989 | Koller et al. | ............... 52/480 |
| 4,879,857 A | | 11/1989 | Peterson et al. | |
| 4,890,434 A | | 1/1990 | Niese | |
| 4,945,697 A | | 8/1990 | Ott et al. | |
| 5,118,086 A | * | 6/1992 | Stevenson et al. | ............ 267/70 |
| 5,277,010 A | | 1/1994 | Stephenson et al. | |
| 5,412,917 A | | 5/1995 | Shelton | |
| 5,549,327 A | * | 8/1996 | Rusche et al. | ............... 280/751 |
| 5,609,000 A | | 3/1997 | Niese | |
| 5,619,832 A | | 4/1997 | Myrvold | |
| 6,141,931 A | | 11/2000 | Simmons | |
| 6,357,717 B1 | * | 3/2002 | Kennard, IV | ............... 248/638 |
| RE37,615 E | | 4/2002 | Niese | |
| 6,363,675 B1 | | 4/2002 | Shelton | |
| 6,397,543 B1 | | 6/2002 | Hamar | |
| 6,457,261 B1 | * | 10/2002 | Crary | ..................... 36/27 |
| 6,742,312 B2 | * | 6/2004 | Valentine | .............. 52/403.1 |
| 2002/0063369 A1 | * | 5/2002 | Huang | ...................... 267/153 |

* cited by examiner

Primary Examiner—Robert J Canfield
Assistant Examiner—Babajide Demuren
(74) Attorney, Agent, or Firm—Dunlap Codding, P.C.

(57) ABSTRACT

A shock absorber for a sports floor assembly. The shock absorber has a base portion and a truncated pyramid portion. The base portion is formed of an elastomeric material and is connectable to a sub-flooring of the floor assembly with the second side positioned adjacent to the sub-flooring. The pyramid portion extends from the first side of the base portion. The pyramid portion is formed of an elastomeric material and has stepped sides.

9 Claims, 2 Drawing Sheets

SHOCK ABSORBER FOR SPORTS FLOOR

BACKGROUND OF THE INVENTION

1. Field of the Invention

The present invention relates generally to a shock absorber, and more particularly, but not by way of limitation, to a shock absorber for a sports floor.

2. Brief Description of the Related Art

It is generally known to provide cushioning pads under a sports flooring system in order to provide resiliency to the floor. In such known systems, the amount of cushioning provided by the pads is generally controlled by the durometer, i.e., the hardness of the pads. There are both advantages and disadvantages to using either hard or soft pads.

Specifically, in sports such as basketball and racquetball, it is important that the floor be relatively stiff, so that the ball bounces back easily and uniformly throughout the floor. High durometer (hard) resilient pads produce a floor having preferred ball response characteristics. However, hard pads provide little shock absorption, and have a greater potential to cause injury to the athlete. This problem is especially severe when heavy loading occurs from a number of athletes performing in close proximity to each other.

Low durometer (soft) resilient pads provide greater shock absorption and hence provide a higher level of safety or protection to the athlete. However, floors employing such soft pads do not produce desirable ball response characteristics under normal loading conditions, and thus are not suitable for sports such as basketball and racquetball. Furthermore, soft pads are prone to "compression set" which is a permanent change in profile after the pad has been subjected to high loads for a long period of time. Such compression set can occur in areas where bleachers, basketball standards, or other gymnasium equipment are likely to be placed for periods of time.

DETAILED DESCRIPTION OF EXEMPLARY EMBODIMENTS

Figure 1:
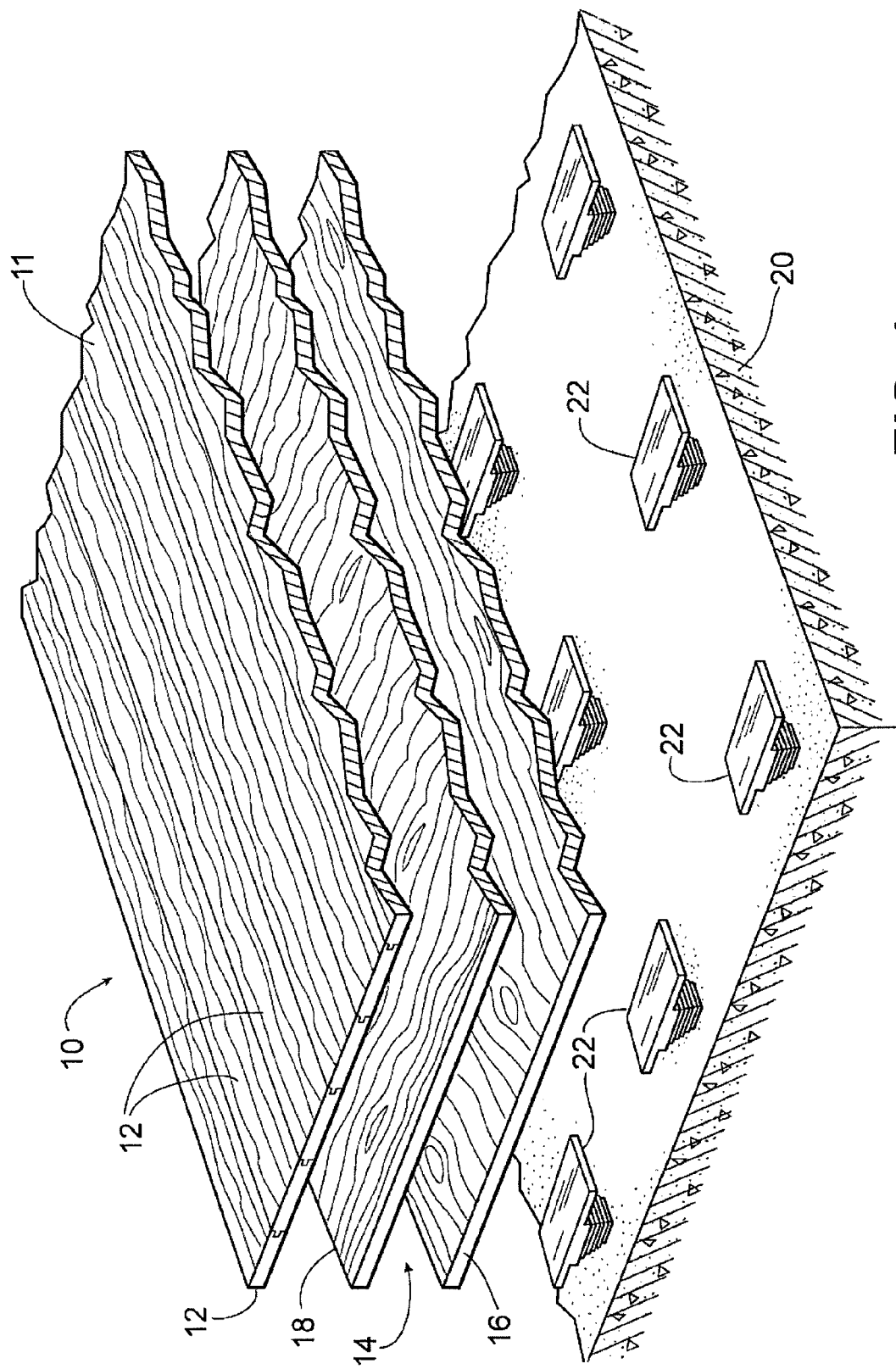
FIG. 1 is an exploded, perspective view of a sports floor utilizing a shock absorber constructed in accordance with the present invention.

Referring now to the drawings, and more particularly to FIG. 1, a floor assembly 10 having a playing surface 11 made out of strips of wood 12 is illustrated. The floor assembly 10 illustrated is the type that would be suitable for playing basketball. The strips of wood 12 are typically manufactured from maple or other suitable wood. Resting directly under and in contact with the underside of the playing surface 11 is a sub-flooring 14. The sub-flooring 14 typically includes a first layer of plywood 16 and a second layer of plywood 18. The first layer of plywood 16 is often oriented in one direction while the second layer of plywood 18 is oriented in a second direction which is often 45° (not shown) or 90° (FIG. 1) relative to the first direction. A cement slab is generally provided as a rigid support base 20 for the playing surface 11 and the sub-flooring 14.

A plurality of shock absorbers 22 constructed in accordance with the present invention are illustrated supporting the sub-flooring 14 in a spaced apart relation with respect to the base 20. The shock absorbers 22 are connected to the bottom surface of the first layer of plywood 16 at an equal center-to-center distance. For a basketball court, the shock absorbers 22 are generally required to be spaced at $9^{13/16}$ inch center-to-center intervals, by way of example. For a multi-purpose floor, the shock absorbers 22 would generally be required to be spaced at twelve inch center-to-center intervals to provide additional flex in the playing surface.

Figure 2:
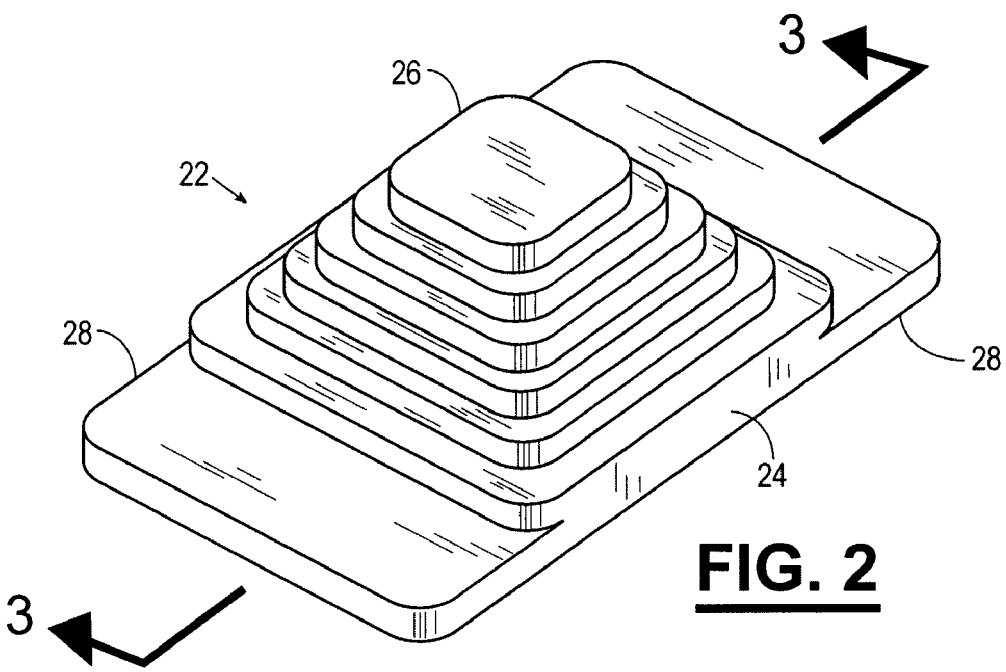
FIG. 2 is a perspective view of the shock absorber of the present invention.
Figure 3:
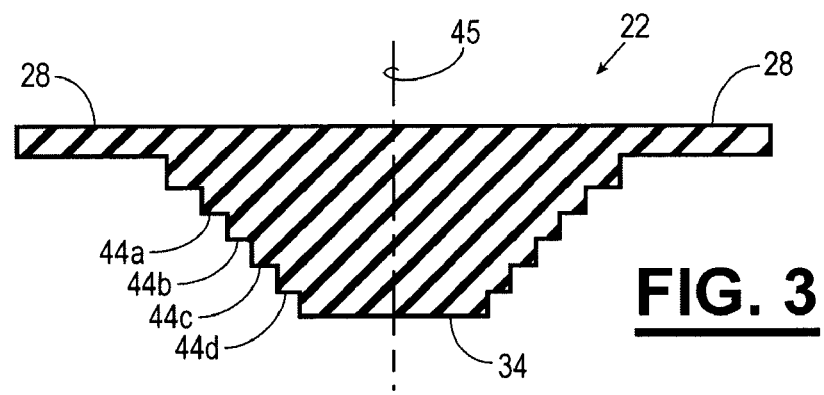
FIG. 3 is a cross-section taken along line 3-3 of FIG. 2.
Figure 4:
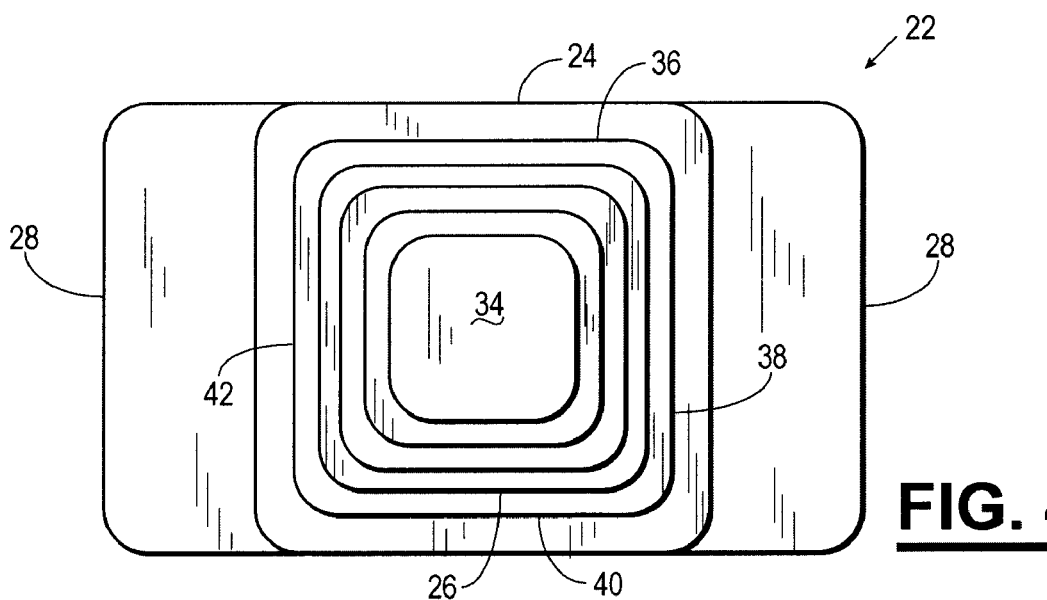
FIG. 4 is a top plan view of the shock absorber of the present invention.

Referring now to FIGS. 2-4, the shock absorber 22 has a base portion 24 and a pyramid portion 26. The base portion 24 has a substantially square configuration and is shown to be provided with a pair of connector tabs 28 which are formed to extend from opposing ends of the base portion 24 to facilitate attachment of the shock absorber 22 to the sub-flooring 14 with a fastener, such as a staple. The connector tabs 28 are shown to have a rectangular configuration and a thickness less than the thickness of the base portion 24. However, it should be appreciated that the connector tabs 28 may be constructed in a variety of shapes and sizes so long as the shock absorber 22 is capable of being attached to the sub-flooring 14.

The pyramid portion 26 extends centrally from the base portion 24 and preferably has a diameter less than the base portion 24. The pyramid portion 26 is shown to have a truncated upper end 34 and four sides 36, 38, 40, and 42. In a preferred embodiment, each of the sides 36-42 is formed to have a plurality of steps 44a, 44b, 44c, and 44d which generally have a right angle configuration with an upper surface of the steps 44a-44d being substantially perpendicular to a central axis 45 (FIG. 3) of the shock absorber 22. Each of the steps 44a-44d extends continuously about the pyramid portion 26 so that each of the steps 44a-44d of one side of the pyramid portion 26 is contiguous with a corresponding step 44a-44d of an adjacent side. It will be appreciated that while the pyramid portion 26 has been described as having four steps, the shock absorber 22 may also be referred to as a seven stage pyramid. By doing so, the steps formed by the connector tabs 28, the base portion 24, and the truncated upper end 34 are included. Also, while the pyramid portion 26 has been described and illustrated as having four sides, it should be appreciated that the pyramid portion 26 may be configured to have variety of different numbers of sides and steps depending on the desired floor characteristics.

The shock absorber 22 is formed into a one piece unit using conventional manufacturing processes, such as vulcanization, and can be formed from a variety of elastomeric materials, such as rubber, PVC, neoprene, nylon, plastisol, or polyurethane. As discussed above, high durometer (hard) resilient shock absorbers produce a floor having preferred ball response characteristics; however, hard shock absorbers provide low shock absorption, and thus have a greater potential to cause harm to the athlete. Yet, floors employing soft shock absorbers do not produce desirable ball response characteristics. Desirable results have been obtained by constructing the shock absorber 22 from a plastisol having a durometer Shore hardness of 65.

The steps 44a-44d of the pyramid portion 26 are dimensioned so that the combination of the base portion 24 and the pyramid portion 26 provides the desired shock absorbing characteristics that cause the floor assembly 10 to absorb a significant percentage of the impact force of an individual's foot while maintaining a firmness which controls the deformation of the playing surface and results in a desirable ball response off the playing surface. It should be understood that the number and thickness of the steps may altered to provide a shock absorber which provides the desired floor characteristics.

The DIN standards were developed to ensure that aerobic athletes received a greater degree of safety and performance from a flooring surface when participating in aerobic exercise. There are four basic testing areas under the DIN standards. These areas are: area deflection, vertical deflection, shock absorption, and ball deflection. Area deflection measures the floor system's ability to contain the deflected area under an athlete's impact, measured within twenty inches of the impacted area. Vertical deflection measures the floor system's downward movement during the impact of an athlete landing on the surface. This measurement is interdependent with area deflection criteria. Shock absorption measures the floor system's ability to absorb impact forces normally absorbed by the athlete when landing on a hard surface such as concrete or asphalt. Finally, ball deflection measures the ball's response off the sports floor system as compared to the ball's response off concrete.

Other standards exist as well. For example, the EN standards have recently been developed. The EN standards focus on three test areas: vertical deflection, shock absorption, and ball deflection.

A test pod incorporating the shock absorber 22 described above were tested by ASET Services, Inc. utilizing the test methods described in the DIN 18032.2 (1991) Standard and EN 14904 (2006). The test pod had the shock absorbers 22 spaced at twelve inches. The results of those tests are as follows:

DIN 18032.2 (1991) Standard Performance Data by Test Point

| Point | Ball Rebound Required: Minimum 90% | Force Reduction Required: Minimum 53% | Vertical Deflection Required: Minimum 2.3 mm | Area Indentation Required: Maximum 15% |
|---|---|---|---|---|
| 1 | 96% | 55% | 2.5 mm | 13% |
| 2 | 94% | 55% | 2.7 mm | 11% |
| 3 | 95% | 55% | 2.2 mm | 13% |
| 4 | 94% | 56% | 2.4 mm | 10% |
| 5 | 94% | 57% | 2.2 mm | 14% |
| 6 | 93% | 55% | 2.5 mm | 11% |
| 7 | 93% | 56% | 2.1 mm | 13% |
| 8 | 94% | 55% | 2.7 mm | 10% |
| 9 | 94% | 53% | 2.0 mm | 12% |
| 10 | 95% | 53% | 2.0 mm | 21% |
| Average | 94% | 55% | 2.3 mm | 12.60% |

EN 14904 (2006) Performance Data by Test Point

| Point | Ball Rebound Required: Minimum 90% | Force Reduction Required: Minimum 25% to 75% | Vertical Deflection Required: Minimum <5 mm |
|---|---|---|---|
| 1 | 96% | 55% | 2.5 mm |
| 2 | 94% | 55% | 2.7 mm |
| 3 | 95% | 55% | 2.2 mm |
| 4 | 94% | 56% | 2.4 mm |
| 5 | 94% | 57% | 2.2 mm |
| 6 | 94% | 55% | 2.5 mm |
| 7 | 93% | 56% | 2.1 mm |
| 8 | 94% | 55% | 2.7 mm |
| 9 | 94% | 51% | 2.0 mm |
| 10 | 95% | 53% | 2.0 mm |
| Average | 94% | 55% | 2.3 mm |
| Minimum | 93% | 51% | 2.0 mm |
| Maximum | 96% | 57% | 2.7 mm |

From the above description it is clear that the present invention is well adapted to carry out the objects and to attain the advantages mentioned herein as well as those inherent in the invention. While a presently preferred embodiment of the invention has been described for purposes of this disclosure, it will be understood that numerous changes may be made which will readily suggest themselves to those skilled in the art and which are accomplished within the spirit of the invention disclosed and as defined in the appended claims.

What is claimed is:

1. A floor assembly, comprising:
a plurality of strips of material cooperating to form a floor surface;
a sub-flooring positioned beneath the strips of material to support the strips of material; and
a plurality of shock absorbers positioned between the sub-flooring and a rigid support base to support the sub-flooring in a spaced apart relation with respect to the rigid support base, each of the shock absorbers comprising:
a base portion having a first side and an opposing second side, the base portion formed of an elastomeric material; and
a pyramid portion extending from the first side of the base portion, the pyramid portion formed of a single elastomeric material and having stepped sides,
wherein the stepped sides of the pyramid portion of the shock absorbers are dimensioned such that the strips of material, the sub-flooring, and the shock absorbers cooperate to provide the floor assembly with shock absorbing characteristics that enable the floor assembly to absorb at least about fifty-three percent of an impact force applied to the playing surface while maintaining a firmness that limits vertical deflection of the playing surface to be at most about 2.3 mm and produces a ball response off the playing surface of at least about ninety percent.

2. The floor assembly of claim 1 wherein the pyramid portion has four stepped sides.

3. The floor assembly of claim 1 wherein the pyramid portion is truncated.

4. The floor assembly of claim 1 wherein the base portion has a substantially square configuration.

5. The floor assembly of claim 1 wherein the pyramid portion is a substantially square pyramid.

6. The floor assembly of claim 1 wherein the stepped sides are defined by a plurality of steps, and wherein each of the steps of the stepped sides is contiguous with a corresponding step of an adjacent side.

7. The floor assembly of claim 1 wherein the durometer Shore hardness of the base portion and the pyramid portion is approximately 65.

8. The floor assembly of claim 1 wherein each of the shock absorbers is connected to the sub-flooring of the floor assembly with the second side of the base portion positioned adjacent to the sub-flooring.

9. The floor assembly of claim 1 wherein each of the shock absorbers further comprises a pair of connector tabs extending from the base portion, the connector tabs are connected to the sub-flooring with the second side of the base portion positioned adjacent to the sub-flooring.

* * * * *